United States Patent
Finkel et al.

(10) Patent No.: US 9,490,728 B1
(45) Date of Patent: Nov. 8, 2016

(54) MAGNETOELECTRIC ENERGY HARVESTING

(71) Applicants: Peter Finkel, Baltimore, MD (US); Ahmed H Amin, North Attleboro, MA (US); Marilyn Wun-Fogle, Potomac, MD (US); James B Restorff, College Park, MD (US); Joseph J Stace, Narragansett, RI (US); Colin J Murphy, Newport, RI (US)

(72) Inventors: Peter Finkel, Baltimore, MD (US); Ahmed H Amin, North Attleboro, MA (US); Marilyn Wun-Fogle, Potomac, MD (US); James B Restorff, College Park, MD (US); Joseph J Stace, Narragansett, RI (US); Colin J Murphy, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 247 days.

(21) Appl. No.: 14/548,414

(22) Filed: Nov. 20, 2014

(51) Int. Cl.
*H02N 2/18* (2006.01)
(52) U.S. Cl.
CPC ........................... *H02N 2/18* (2013.01)
(58) Field of Classification Search
CPC .......................................................... H02N 2/18
USPC ............................................................. 310/339
See application file for complete search history.

(56) References Cited

U.S. PATENT DOCUMENTS

| | | | | |
|---|---|---|---|---|
| 6,711,097 | B1* | 3/2004 | Engdahl ................. | G10K 9/121 367/174 |
| 9,048,762 | B1* | 6/2015 | Finkel ..................... | H01L 41/18 |
| 2003/0160118 | A1* | 8/2003 | Schmauser ........ | F02M 51/0603 239/585.1 |
| 2006/0021261 | A1* | 2/2006 | Face ......................... | A43B 3/00 36/132 |
| 2007/0277608 | A1* | 12/2007 | Lopatin ............... | G01F 23/2966 73/584 |
| 2011/0316362 | A1* | 12/2011 | Nair ...................... | H01L 41/125 310/26 |
| 2012/0228875 | A1* | 9/2012 | Hardin, Jr. .......... | E21B 41/0085 290/52 |
| 2013/0002056 | A1* | 1/2013 | Nair .................... | F03B 13/1885 310/26 |
| 2014/0225371 | A1* | 8/2014 | Nair ........................ | H02N 2/18 290/53 |
| 2015/0083196 | A1* | 3/2015 | Gray ................... | H01L 31/0547 136/248 |
| 2016/0268930 | A1* | 9/2016 | Viala ....................... | H02N 2/18 |

* cited by examiner

*Primary Examiner* — J. San Martin
(74) *Attorney, Agent, or Firm* — James M. Kasischke; Michael P. Stanley

(57) ABSTRACT

An energy harvesting device for harvesting energy from a moving structure includes a housing allowing transmission of magnetic fields therethrough. A piezoelectric material capable of a phase transition and a magnetostrictive material capable of a structural change when subjected to a magnetic field are mechanically coupled to each other in the housing. An adjustable pre-stress means is positioned between the housing and the combination of the piezoelectric and magnetostrictive materials. Electrical contacts are positioned on the piezoelectric material. A magnet is mounted on the moving structure. The housing is mounted in sufficient proximity to the magnet for the magnetic field of the magnet to induce the structural change in the magnetostrictive material.

18 Claims, 4 Drawing Sheets

MAGNETOELECTRIC ENERGY HARVESTING

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to an electro-mechanical energy harvesting device and more particularly relates to such a device that has a magnetostrictive and piezoelectric component.

(2) Description of the Prior Art

It is known that ferroelectric single crystals convert mechanical energy to electrical energy or vice versa. This makes them a candidate as the active material in energy harvesting devices. By utilizing the direct piezoelectric (or pyroelectric) effect when mechanical or thermal energy is available from the environment, the mechanical or thermal energy can be converted to electric charge polarization in relaxor ferroelectric single crystal material and useful amounts of energy can be obtained.

Relaxor single crystals display both a linear piezoelectric effect and a non-linear electromechanically coupled phase transition. The linear piezoelectric effect in relaxor single crystals has been well characterized and is extraordinarily large, approximately a factor of six times that of the ceramic lead zirconate titanate (PZT). The non-linear electromechanically coupled phase transition associated with field and stress driven phase transformations has been the subject of extensive study, especially for lead indium niobate-lead magnesium niobate-lead titanate (PIN-PMN-PT) ternaries. Reversible stress and temperature induced phase transformations are associated with spontaneous charge generation in the relaxor single crystals. FIG. 1 is a graph showing strain versus stress for a representative phase change piezoelectric material. FIG. 1 clearly shows a large strain jump at the stress and field induced phase transformation. These stress and field driven phase transformations offer significant new approaches to energy harvesting. These results demonstrate that phase transformations can provide more than an order of magnitude increase in energy density per cycle for mechanical energy harvesting. Utilizing this phase transformation behavior suggests that a stress-biased energy harvester would take maximum advantage of the phase transformation in the relaxor single crystal material.

Magnetostrictive materials are similar to ferroelectric materials because they convert magnetic energy into mechanical energy. However, magnetostrictive materials utilize a magnetic field rather than an electrical field. An applied magnetic field can alter the direction of the magnetic moments inside the material, and the magnetic moments will tend to align themselves in the direction of the applied magnetic field. This directional change of the magnetic moments is coupled to the material's lattice via spin-orbit coupling and results in a physical change in the dimension of the material. It is known to utilize this physical change in mechanical applications and control systems.

It is known to use piezoelectric materials to harvest energy. Piezoelectric materials will generate electric potential when subjected to some kind of mechanical stress. However, piezoelectric materials have constraints on their ability to function properly, such as temperature, force, and pressure. These constraints, along with the difficulty of attaching piezoelectric materials to rotating or moving machinery, make it difficult to locate piezoelectric material devices in contact with the mechanical stress generator which allows the piezoelectric material to act as an energy harvesting device.

It is also known to use magnetostrictive materials to harvest energy. Magnetostrictive materials are able to harvest vibrational energy from vibrating pumps, motors, buildings, ships, etc. since magnetostrictive materials are able to change shape in response to a magnetic field, and it is known to use these changes in magnetic state to induce a voltage in coils, which can then be converted into power.

SUMMARY OF THE INVENTION

Accordingly, it is an object of the present invention to provide an energy harvesting device for a changing magnetic field.

It is another object of the present invention to provide an energy harvesting device having maximum efficiency.

Accordingly, there is provided an energy harvesting device for harvesting energy from a moving structure. The device has a rigid, hollow housing capable of allowing the transmission of a magnetic field therethrough. A piezoelectric material is positioned in the hollow housing. A magnetostrictive material capable of a structural change when being subjected to a magnetic field is also positioned in the housing mechanically coupled to the piezoelectric material. An adjustable pre-stress means is positioned between the housing and the piezoelectric material and magnetostrictive material combination to apply a pre-stress to the piezoelectric material and the magnetostrictive material. Electrical contacts are joined in contact with the piezoelectric material. A magnet mounted on the moving structure induces the structural change in the magnetostrictive material when the magnet is nearest the housing. The structural change stresses the piezoelectric material which generates electrical potential at the contacts.

BRIEF DESCRIPTION OF THE DRAWINGS

The above and other objects and advantages of the present invention will become apparent from the following description, drawings and claims wherein:

DETAILED DESCRIPTION OF THE INVENTION

Figure 1:
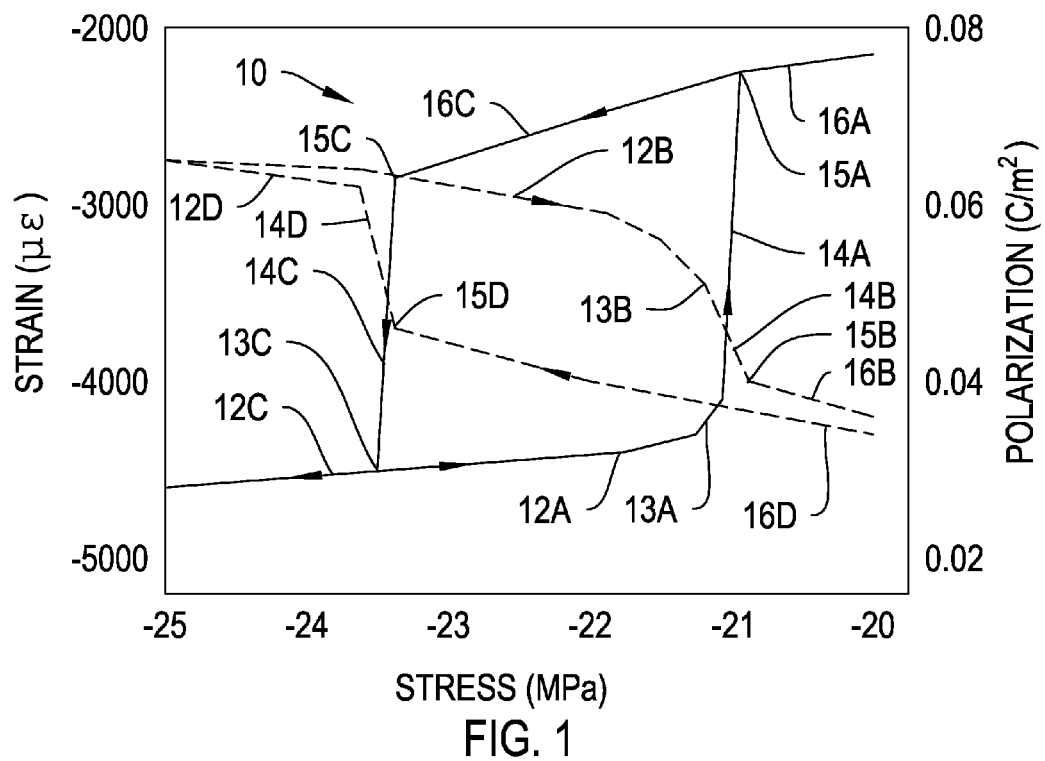
FIG. 1 is a graph showing strain versus stress for a representative phase change piezoelectric material.

FIG. 1 is a graph that generically depicts hysteresis curves 10 of a single crystal material having a sharp elastic instability near the phase transition point. The curve with a solid line shows the stress/strain response, and the curve with the dashed line shows the stress/polarization response. As compressive stress increases in the material, strain response increases linearly in region 12A and polarization declines somewhat linearly at 12B. A phase transition point occurs at 13A. Polarization transition is shown at 13B. During phase transition the response is shown as indicated at 14A and 14B. Strain response is rapid during phase transition and polarization response is somewhat slower. The phase transition completes as indicated at 15A and 15B. A second linear region begins as indicated at 16A and 16B. As compressive stress is reduced, strain declines linearly in region 16C, and polarization increases somewhat linearly at 16D. Once stress declines sufficiently, a phase transition occurs at 15C and 15D. The response during phase transition is shown at 14C, and phase transition completes at 13C. The polarization response is shown at 14D. The response enters the linear region at 12C and 12D as stress declines further.

For a given material, the position of this curve and its inflection points depend on pressure, temperature and the electrical field to which the material is subjected. In one known material, this compressive pre-stress occurs in the region between about 24 MPa and 21 MPa as indicated in the FIG. The resulting microstrain (µ∈) is between −2,500 and −4,500 as shown in the FIG. The critical stress is a characteristic of the particular material composition, and it can be determined experimentally for a given temperature and operating condition.

Figure 2:
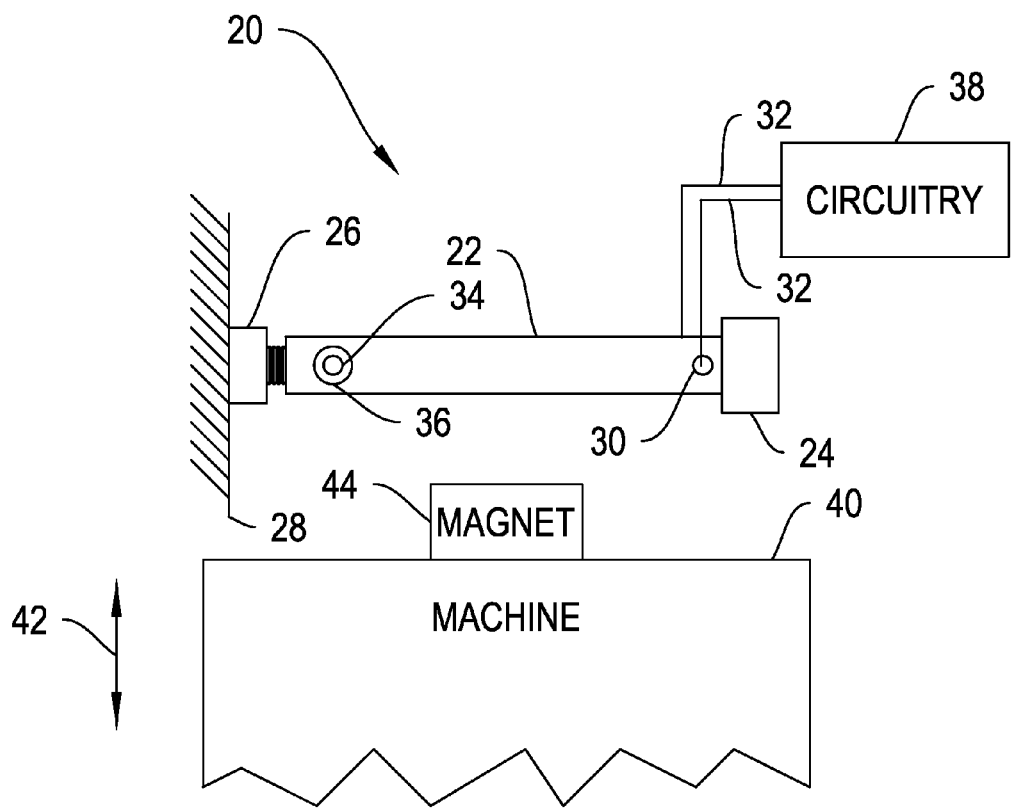
FIG. 2 is a diagram of an energy harvesting device and its operational set up.

FIG. 2 depicts an energy harvesting device 20 with a hollow housing 22. Hollow housing 22 is made from a material that can support tensile loading while allowing the transmission of magnetic fields therethrough, such as aluminum, another non-ferroelectric material, or the like. Hollow housing 22 has terminal exterior threads on a first end and internal threads on a second end. A cap 24 is affixed to hollow housing 22 first end, and a compression bolt 26 is affixed to hollow housing 22 second end. Cap 24 and compression bolt 26 contain appropriate complementary threads and are made from a material such as a non-ferrous metal or the like. A mounting location 28 serves as a mounting location for energy harvesting device 20. Energy harvesting device 20 can be mounted by cap 24 and/or compression bolt 26. Access apertures 30 can be added to hollow housing 22. Wires 32 can go through access apertures 30 to access a piezoelectric material discussed hereinafter. Anti-torsion plug 34 can be located in anti-torsion apertures 36 in hollow housing 22 to prevent twisting.

Energy harvesting device 20 is mounted in proximity to a machine 40. Machine 40 vibrates in direction 42. Magnet 44 is attached to machine 40, preferably such that the entirety of a magnetostrictive material discussed hereinafter is in the magnetic field. A lesser response will result if the entirety of the magnetostrictive material is not in the magnetic field. Magnet 44 preferably being capable of generating a changing magnetic field of about at least ±50 Oe on the magnetostrictive material as it vibrates on machine 40.

In operation, magnet 44 joined to machine 40 provides a time varying magnetic field on the magnetostrictive material to actuate the piezoelectric material as a harvester. As the magnetostrictive rod is activated by external magnetic field it expands linearly. Because the magnetostrictive rod is constrained by cap 24 and bolt 26, rod causes compressive stress that is transmitted to piezoelectric material. Piezoelectric material and magnetostrictive rod have been subjected to a preload stress close to the critical stress required for ferroelectric phase transition. Compressive stress from the rod loads the piezoelectric material with additional force needed to bring the piezoelectric material through the phase transformation (from that point this is equivalent to mechanical energy harvesting process). Preload stress on the magnetostrictive material optimizes the slope of the magnetostriction versus field curve.

Figure 3:
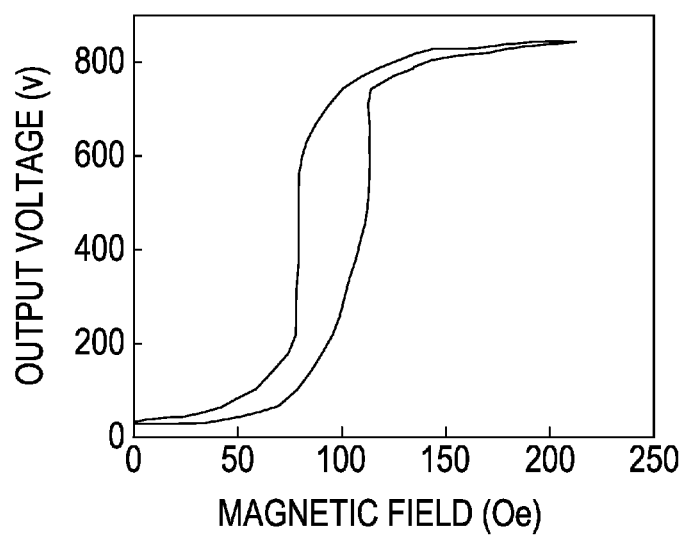
FIG. 3 is a graph showing test results for output voltage versus magnetic field for the embodiment of FIG. 2.

FIG. 3 is a graph of results obtained using energy harvesting device 20 subjected to a varying magnetic field with a galfenol (FeGa) magnetostrictive material and a PIN-PMN-PT piezoelectric single crystal material. This shows that about 600 volts can be obtained with a magnetic field difference of about 15 Oe. The magnetoelectric coefficient, ME, as estimated from experimental results is:

$$ME = \frac{dE}{dH} > 40 \frac{V}{cm \times Oe} \quad (1)$$

where E is the electric field per centimeter (V/cm), and H is the magnetic field (Oe). This is a non-resonant mode estimate. Results for known energy harvesters are usually given in the resonant mode and are capable of delivering energy for a narrower band of frequencies than the tested device. These results are much greater than can be obtained using a simple magnet/coil energy harvester arrangement as is known in the art.

Figure 4:
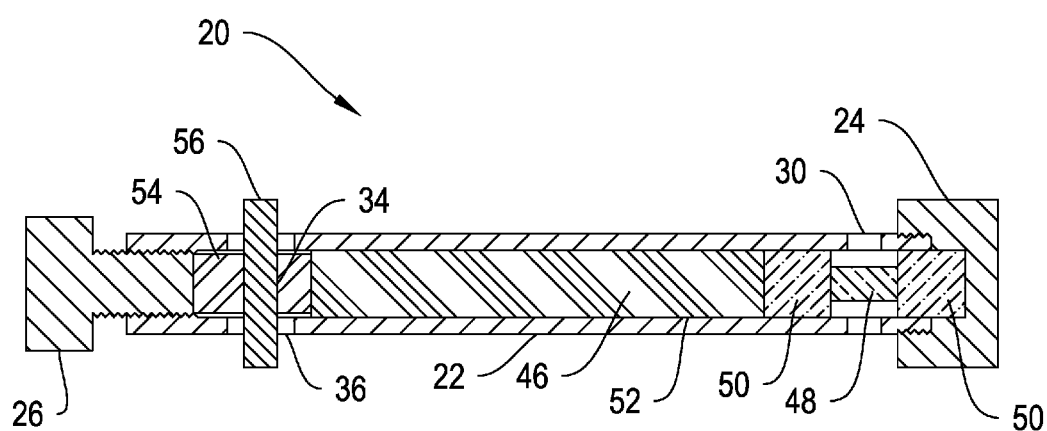
FIG. 4 is a cross-sectional view of a first embodiment of the energy harvesting device.

FIG. 4 provides a sectional diagram of energy harvesting device 20 with hollow housing 22. A magnetostrictive material 46, a piezoelectric material 48, and dielectric plugs 50 are located inside the cavity of hollow housing 22. Magnetostrictive material 46 can be a magnetostrictive material such as galfenol, Terfenol-D®, Metglas®, ferrite, cobalt, nickel, or the like. Piezoelectric material 48 is preferably a piezoelectric or ferroelectric crystal such as PIN-PMN-PT or the like. Non-crystalline and composite materials can be used but will give significantly lower output. Dielectric plugs 50 can be made from an electrically insulating material capable of supporting and aligning the load, such as ceramic or the like. Hollow housing 22 also has access apertures 30 which allow for electrical contact with piezoelectric material 48. There is an optional friction reducing material 52 between hollow housing 22 and magnetostrictive material 46. Friction reducing material 52 is made of a material that can reduce the friction between magnetostrictive material 46 and hollow housing 22, such as polytetrafluoroethylene (such as Teflon® tape), poly (4,4'-oxydiphenylene-pyromellitimide) (such as Kapton®), or the like. Anti-torsion plug 34 has a shaft 54 capable of bearing compressive stress and arms 56. Arms 56 are positioned in anti-torsion apertures 36 formed in hollow housing 22. (If the components located in housing 22 twist, arms 56 interfere with housing 22 at apertures 36 to prevent twisting).

Compression bolt 26 is adjusted to place the piezoelectric material 48 near the phase boundary. This can also be done electrically. If necessary, a magnetic bias field can be applied to the magnetostrictive material 46 to move piezoelectric material 48 closer to the phase transition. The oscillating magnetic field created by magnet 44 and vibrating machine 40 causes magnetostrictive material 46 to expand and contract. If the resulting stress on piezoelectric material 48 is sufficient to cause a phase transition (ex. orthorhombic phase and rhombohedral phase), large amounts of energy can be generated. Direction of vibration 42 can be longitudinal, lateral, and/or axial depending on the polarization orientation of piezoelectric material 48 and the design constraints of energy harvesting device 20.

The changing magnetic field created by magnet 44 and vibrating machine 40 causes a rearrangement of dipoles in magnetostrictive material 46 which causes magnetostrictive material 46 to change shape. This change in shape applies a stress on piezoelectric material 48 which causes a phase transformation in piezoelectric material 48. This phase transformation causes piezoelectric material 48 to generate energy, which can then flow into wires 32. The energy can then flow to circuitry 38, which can preferably do the signal conditioning. Circuitry 38 can be a load, a battery, or most likely conditioning circuitry which then is connected to a battery.

Figure 5:
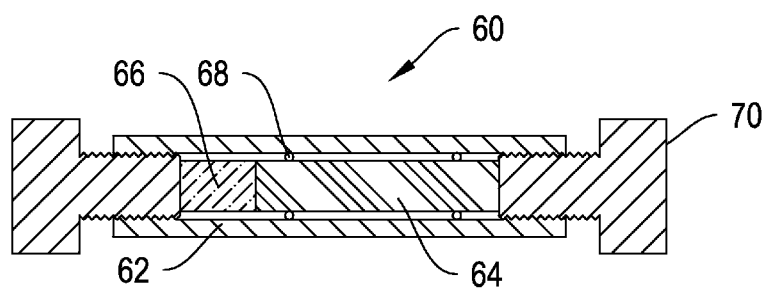
FIG. 5 is a cross-sectional view of a second embodiment of the energy harvesting device.

FIG. 5 depicts an energy harvesting device 60 with a hollow housing 62. Hollow housing 62 is made from a material that can support tensile loading while allowing the transmission of magnetic fields therethrough, such as aluminum, another non-ferroelectric material, or the like. A magnetostrictive material 64, a piezoelectric material 66, and anti-friction guides 68 can be located inside the cavity of hollow housing 62. Magnetostrictive material 64 can be a magnetostrictive material such as galfenol, Terfenol-D®, Metglas®, ferrite, cobalt, nickel, or the like. Piezoelectric material 66 is preferably a piezoelectric or ferroelectric material such as PIN-PMN-PT or the like. Guides 68 are preferably made out of a material that would allow magnetostrictive material 64 to slide along hollow housing 62 with minimal friction, such as rubber, polytetrafluoroethylene (such as Teflon®), or the like. Compression bolt 70 is preferably made from a material such as a non-ferrous metal or the like. Hollow housing 62 and compression bolt 70 contain appropriate complementary threads to allow the two to be attached.

Figure 6:
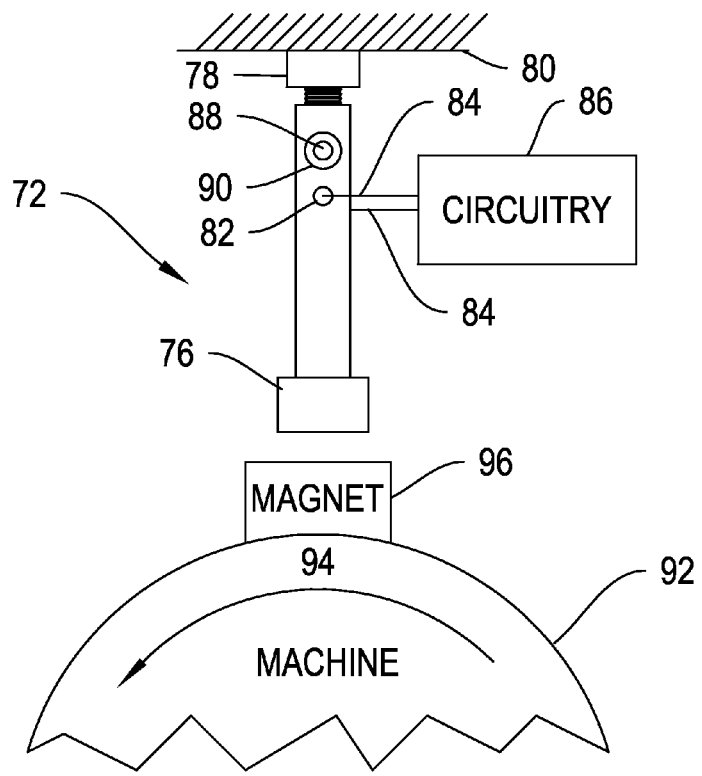
FIG. 6 is a diagram of a third embodiment of the energy harvesting device and a second operational set up.
Figure 7:
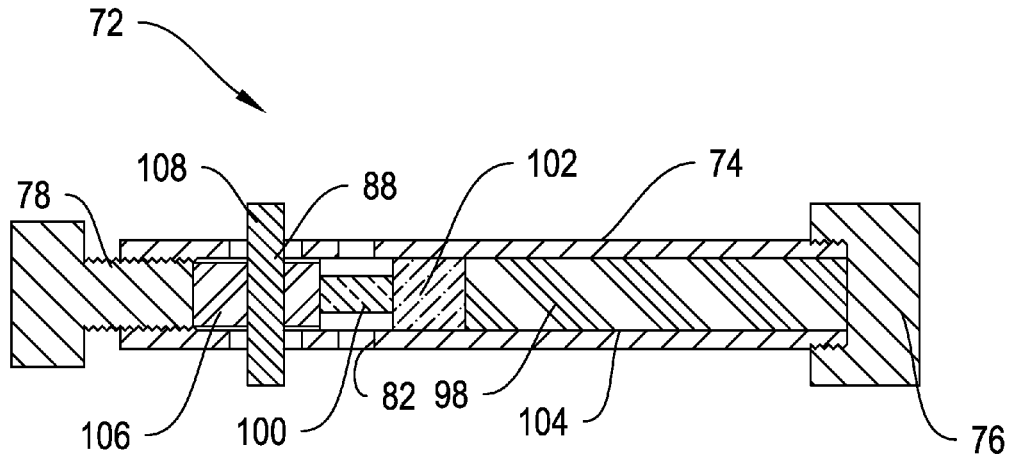
FIG. 7 is a cross-sectional view of a third embodiment of the energy harvesting device.

FIGS. 6 and 7 depict another embodiment of an energy harvesting device 72 with a hollow housing 74. Hollow housing 74 is made from a material that can support tensile loading while allowing the transmission of magnetic fields therethrough, such as aluminum, another non-ferroelectric material, or the like. Hollow housing 74 has terminal exterior threads on a first end and internal threads on a second end. A cap 76 is affixed to hollow housing 74 first end, and a compression bolt 78 is affixed to hollow housing 74 second end. Cap 76 and compression bolt 78 contain appropriate complementary threads and are made from a material such as a non-ferrous metal or the like. A mounting location 80 serves as a mounting location for energy harvesting device 72. Energy harvesting device 72 can be mounted by cap 76 and/or compression bolt 78. Access apertures 82 can be added to hollow housing 74. Wires 84 can go through access apertures 82 to access a piezoelectric material discussed hereinafter. Circuitry 86 can be connected to wires 84 to create a complete circuit. Anti-torsion plug 88 can be located in anti-torsion apertures 90 in hollow housing 74 to prevent twisting.

Energy harvesting device 72 is mounted in proximity to a machine 92. Machine 92 rotates in direction 94. Magnet 96 is attached to machine 92, preferably such that the entirety of a magnetostrictive material discussed hereinafter is in the magnetic field. A lesser response will result if the entirety of the magnetostrictive material is not in the magnetic field. Magnet 96 preferably being capable of generating a changing magnetic field of about at least ±50 Oe on the magnetostrictive material as it rotates on machine 92.

In operation, magnet 96 joined to machine 92 provides a time varying magnetic field to actuate the piezoelectric material as a harvester. As the magnetostrictive rod is activated by external magnetic field it expands linearly. Because the magnetostrictive rod is constrained by cap 76 and bolt 78, rod causes compressive stress that is transmitted to piezoelectric material. Piezoelectric material and magnetostrictive rod have been subjected to a preload stress close to the critical stress required for ferroelectric phase transition. Compressive stress from the magnetostrictive rod loads the piezoelectric material with additional force needed to bring the piezoelectric material through the phase transformation (from that point this is equivalent to mechanical energy harvesting process).

FIG. 7 provides a sectional diagram of energy harvesting device 72 with hollow housing 74. A magnetostrictive material 98, a piezoelectric material 100, and dielectric plugs 102 are located inside the cavity of hollow housing 74. Magnetostrictive material 98 can be a magnetostrictive material such as galfenol, Terfenol-D®, Metglas®, ferrite, cobalt, nickel, or the like. Piezoelectric material 100 is preferably a piezoelectric or ferroelectric crystal such as PIN-PMN-PT or the like. Non-crystalline and composite materials can be used but will give significantly lower output. Dielectric plugs 102 can be made from an electrically insulating material capable of supporting and aligning the load, such as ceramic or the like. Hollow housing 74 also has access apertures 82 which allow for electrical contact with piezoelectric material 100. There is an optional friction reducing material 104 between hollow housing 74 and magnetostrictive material 98. Friction reducing material 104 is made of a material that can reduce the friction between magnetostrictive material 98 and hollow housing 74, such as polytetrafluoroethylene (such as Teflon® tape), poly (4,4'-oxydiphenylene-pyromellitimide) (such as Kapton®), or the like. Anti-torsion plug 88 has a shaft 106 capable of bearing compressive stress and arms 108. Arms 108 are positioned in anti-torsion apertures 90 formed in hollow housing 74. (If the components located in housing 74 twist, arms 108 interfere with housing 74 at apertures 90 to prevent twisting).

Compression bolt 78 is adjusted to place the piezoelectric material 100 near the phase boundary. This can also be done electrically. If necessary, a magnetic bias field can be applied to the magnetostrictive material to move piezoelectric material 100 closer to the phase transition. The oscillating magnetic field created by magnet 96 and vibrating machine 92 causes magnetostrictive material 98 to expand and contract. If the resulting stress on piezoelectric material 100 is sufficient to cause a phase transition (ex. orthorhombic phase and rhombohedral phase), large amounts of energy can be generated. Direction of vibration 94 can be longitudinal, lateral, and/or axial depending on the polarization orientation of piezoelectric material 100 and the design constraints of energy harvesting device 72.

The changing magnetic field created by magnet 96 and vibrating machine 92 causes a rearrangement of dipoles in magnetostrictive material 98 which causes magnetostrictive material 98 to change shape. This change in shape applies a stress on piezoelectric material 100 which causes a phase transformation in piezoelectric material 100. This phase transformation causes piezoelectric material 100 to generate energy, which can then flow into wires 84. The energy can then flow to circuitry 86, which can preferably do the signal conditioning. Circuitry 86 can be a load, a battery, or most likely conditioning circuitry which then is connected to a battery.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. An energy harvesting device comprising:
   a rigid housing having a hollow therein, said housing being capable of allowing the transmission of magnetic fields therethrough;
   a piezoelectric material capable of a phase transition positioned in said hollow of said rigid housing;
   a magnetostrictive material positioned to apply stress to said piezoelectric material in said hollow of said rigid housing;
   an adjustable pre-stress means positioned between said rigid housing and said piezoelectric material and magnetostrictive material combination to apply a pre-stress to said piezoelectric material and said magnetostrictive material combination; and
   electrical contacts positioned in contact with said piezoelectric material.

2. The apparatus of claim 1 wherein said rigid housing has a first end and a second end, said rigid housing further comprising:
   terminal threads being formed on the first end and threads being formed within the second end;
   a cap capable of being joined to said threads on said rigid housing first end; and
   wherein said adjustable pre-stress means comprises:
   a compression bolt capable of being joined to said threads within said rigid housing second end.

3. The apparatus of claim 2 wherein said cap and compression bolt are made from a non-ferrous metal.

4. The apparatus of claim 1 wherein said rigid housing is made from a non-ferrous metal.

5. The apparatus of claim 1 wherein said piezoelectric material is a single crystal ferroelectric material.

6. The apparatus of claim 1 wherein said magnetostrictive material is capable of changing a dimension when subjected to a magnetic field for stressing said piezoelectric material.

7. The apparatus of claim 1 further comprising a means for facilitating movement between said magnetostrictive material and said rigid housing.

8. The apparatus of claim 7 wherein said means for facilitating movement is a polytetrafluoroethylene coating.

9. The apparatus of claim 7 wherein said means for facilitating movement is at least one O-ring.

10. The apparatus of claim 1 further comprising:
    a first magnetostrictive material positioned in said hollow of said rigid housing;
    a second magnetostrictive material in said hollow of said rigid housing;
    a piezoelectric material positioned in said hollow of said rigid housing subject to stress from said first magnetostrictive material and said second magnetostrictive material; and
    a dielectric material positioned between said first magnetostrictive material and said piezoelectric material, and between said second magnetostrictive material and said piezoelectric material.

11. An energy harvesting device for harvesting energy from a moving structure comprising:
    a rigid housing having a hollow therein capable of allowing the transmission of magnetic fields therethrough;
    a piezoelectric material capable of a phase transition positioned in said hollow of said rigid housing;
    a magnetostrictive material capable of a structural change when being subjected to a magnetic field, said magnetostrictive material positioned to apply stress to said piezoelectric material in said hollow of said rigid housing;
    an adjustable pre-stress means positioned between said rigid housing and said piezoelectric material and magnetostrictive material combination to apply a pre-stress to said piezoelectric material and said magnetostrictive material combination;
    electrical contacts positioned in contact with said piezoelectric material;
    a magnet capable of being mounted on said moving structure;
    wherein said rigid housing is mounted in sufficient proximity to said magnet for a magnetic field of said magnet to induce the structural change in said magnetostrictive material when said magnet is nearest to said rigid housing.

12. The apparatus of claim 11 wherein said moving structure is vibrating machinery.

13. The apparatus of claim 11 wherein said moving structure is rotating machinery.

14. The apparatus of claim 11 wherein said rigid housing is capable of being mounted on a mounting location proximate to the moving structure.

15. The apparatus of claim 14 wherein said mounting location is a wall.

16. The apparatus of claim 11 wherein said rigid housing has a first end and a second end, said rigid housing further comprising:
    terminal exterior threads being formed on the first end and internal threads being formed within the second end;
    a cap capable of being joined to said exterior threads on said rigid housing first end; and
    wherein said adjustable pre-stress means comprises:
    a compression bolt capable of being joined to said interior threads within said rigid housing second end.

17. The apparatus of claim 16 wherein said cap and compression bolt are made from a non-ferrous metal.

18. The apparatus of claim 11 further comprising:
    a first magnetostrictive material positioned in said hollow of said rigid housing;
    a second magnetostrictive material in said hollow of said rigid housing;
    a piezoelectric material positioned in said hollow of said rigid housing in contact with said first magnetostrictive material and said second magnetostrictive material; and
    a dielectric material positioned between said first magnetostrictive material and said piezoelectric material, and between said second magnetostrictive material and said piezoelectric material wherein said dielectric material is capable of electrically insulating said piezoelectric material from said magnetostrictive material.

* * * * *